No. 776,199. PATENTED NOV. 29, 1904.
F. R. PACKHAM & G. P. OATES.
DISTRIBUTER FOR GRAIN DRILLS.
APPLICATION FILED MAR. 12, 1904.
NO MODEL. 3 SHEETS—SHEET 1.
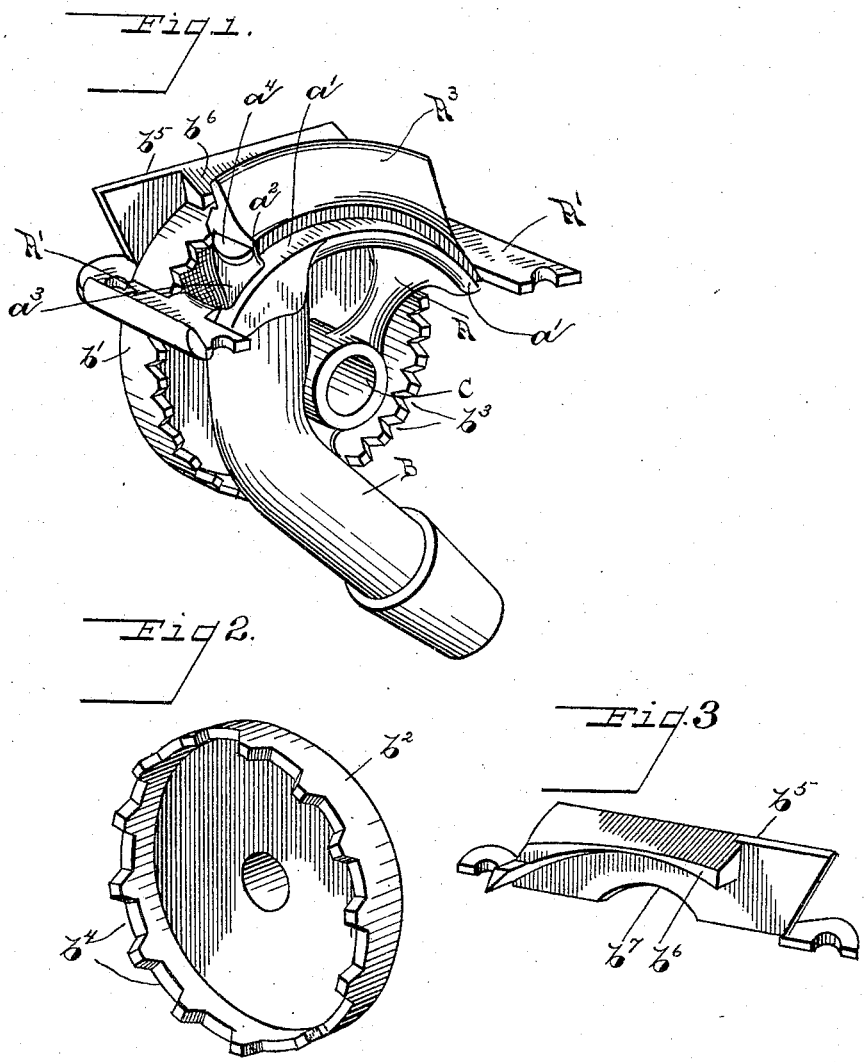

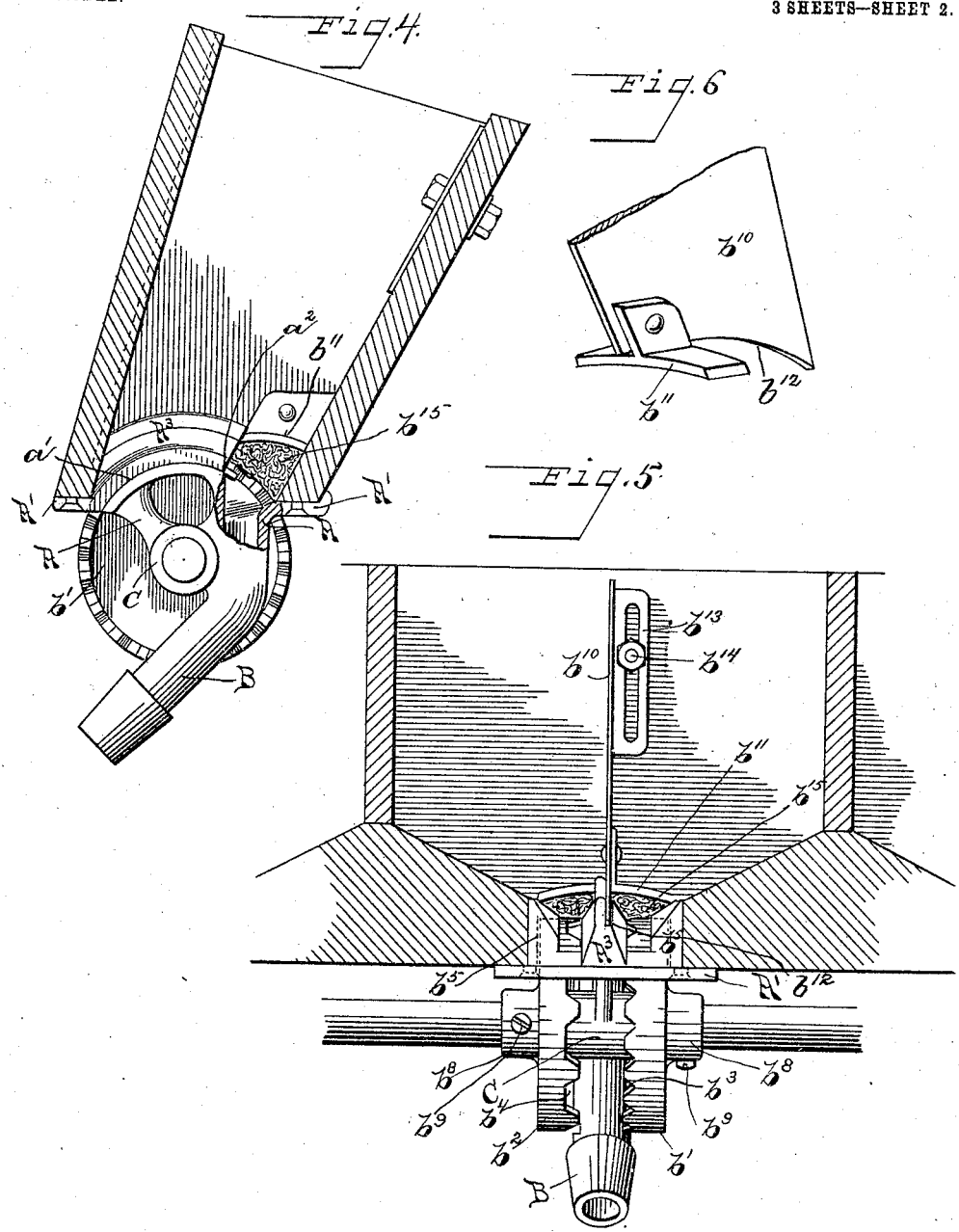

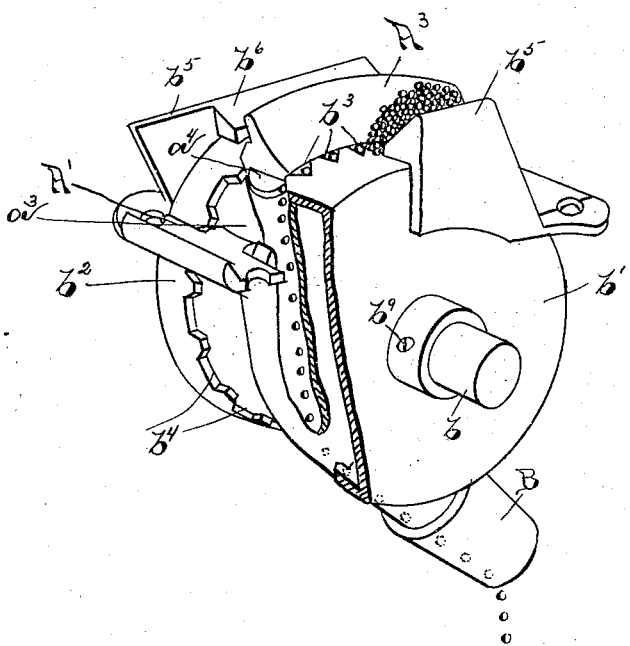

No. 776,199. Patented November 29, 1904.

UNITED STATES PATENT OFFICE.

FRANK R. PACKHAM AND GEORGE P. OATES, OF SPRINGFIELD, OHIO, ASSIGNORS TO AMERICAN SEEDING MACHINE COMPANY, OF JERSEY CITY, NEW JERSEY, A CORPORATION OF NEW JERSEY.

DISTRIBUTER FOR GRAIN-DRILLS.

SPECIFICATION forming part of Letters Patent No. 776,199, dated November 29, 1904.

Application filed March 12, 1904. Serial No. 197,894. (No model.)

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Distributers for Grain-Drills, of which the following is a specification.

Our invention relates to improvements in seeding devices or distributers, and particularly relates to that class of distributers adapted to sow small grains or seeds, such as turnip or rape. There are, however, a variety of seeds which can be sown successfully with this form of distributer.

In all machines employing distributers or seeding devices, such as wheat-drills and similar machines, the manner of sowing a predetermined quantity of grain or seed has become a very essential object in the construction of these machines. It is important that the distributer be so constructed that it will feed accurately a predetermined amount of grain or seed—that is to say, the construction should be such that the operator of the machine may set the mechanism so that the distributer will sow a definite amount of seed or grain to the acre. In machines of this character there are change-of-speed devices so connected with the other parts of the machine that the speed of the distributer can be varied to sow varying amounts of seed. It can readily be seen that the character of this machinery requires that when the operator sets the machine for sowing a predetermined amount of seed or grain the machine shall sow accurately that amount. In order to render the mechanism accurate, it is necessary that the distributer itself shall carry the seed or grain at all times accurately. In sowing small grains or seeds it has been particularly difficult to devise a distributer that would select these small grains out of the hopper and carry them positively to the delivery part of the machine.

Our improvement relates particularly to the distributer itself and is adapted for use with various kinds of change-of-speed devices and, as heretofore stated, with various kinds of machines of this general character.

Our particular object in this invention is to construct a seeding device which will in its operation select one or more seeds and positively feed them into a proper spout or conduit, which spout will carry the seed into a furrow prepared in the ground by the ordinary mechanism. It will thus be seen that this seeding device is adapted for use with various kinds of seeding-machines irrespective of the kind of furrow-opener employed. The construction is such that different varieties of seed can be sown simultaneously, both varieties being conducted into one spout or channel.

In our improved construction we form the distributer so that the cells into which the seed fall furnish the most limited contact for said seed in order to reduce the possibility of an improper feeding of the seed, and we further arrange the parts so as to increase the easy and rapid exit of the seed from the cells at the point of delivery of the seed to the spout or conduit.

In the drawings, Figure 1 is a perspective view of the distributer or seeding device, part of same being removed. Fig. 2 is a detail view of the distributing-wheel. Fig. 3 is a detail view of the guard connected with said wheel. Fig. 4 is a sectional view through the hopper, showing the distributer partly in section. Fig. 5 is a cross-section through the hopper, with a rear elevation of the hopper. Fig. 6 is a detail view of the partition, partly broken away. Fig. 7 is a perspective view of the assembled distributer, partly broken away, showing the seeds being conveyed to and discharged into the seed-conduit.

Like parts are represented by similar characters of reference in the several views.

A indicates the central casting or support for the distributer, and said casting is formed with a projecting part, (indicated by A',) which is adapted to be attached to the bottom of the hopper. $A^3$ indicates an upwardly-projecting extension from said casting, Figs. 1 and 4.

B indicates the spout projecting downwardly from the central casting or support A and formed integral therewith.

C indicates the bearing for the shaft of the machine adapted to support the wheel used in our construction. Said bearing C is supported from the central casting A.

$a'$ indicates the flanges extending laterally from the casting and projecting from each side of the extension $A^3$.

$a^2$ indicates an offset at the end of the projecting flange $a'$ and at the point where the flange $a'$ leads to the delivery-orifice, (indicated by $a^3$.) Said delivery-orifice is located immediately over the spout B and forms the opening to said spout or conduit, Fig. 1.

$a^4$ is a flange projecting beyond extension $A^3$, Fig. 1.

$b'$ indicates one of the feed-wheels, which is journaled on the shaft and rotates therewith, the shaft extending through the bearing C. $b^2$ indicates a corresponding wheel, also journaled on said shaft. Change of speed for said wheels and shaft is made by the usual change-of-speed devices connected with said shaft. These feed-wheels are arranged so as to extend slightly within the bottom of the hopper, as indicated in Fig. 4. We have shown in the drawings the wheel $b'$ formed with notches or serrations (indicated by $b^3$) adapted particularly for the feeding of turnip-seed, while the wheel $b^2$ is formed with notches (indicated by $b^4$) particularly adapted for the sowing of an entirely-different variety of small seed, such as rape. The guard $b^5$ is shown, Fig. 1, in close proximity to the wheel $b'$ and so arranged that the ledge $b^6$ projects over and rests upon the flange of said feed-wheel. A corresponding guard, with a ledge $b^6$, is located in close proximity to the feed-wheel $b^2$, and these guards, with their ledges, form restricted openings for the small seed to fall into from the hopper of the machine. The teeth between the notches or serrations of the feed-wheels come in close proximity to but do not quite touch the sides of the extension $A^3$, so as to form small openings or cells between the side of the extension and the side of and inner part of the serrations formed by the teeth of the distributing-wheel flange.

When the feed-wheels $b'$ and $b^2$ are driven by the usual shaft extending across the machine, the cells formed by the serrations or notches in the feed-wheels, the bottoms of the flange $A'$, and the sides of the extension $A^3$ operate to select the seeds from the hopper, which cells are so formed that a single seed will fall within the cell and be then carried by the wheel to the point $a^2$, where on account of the formation the seed has an unrestricted exit from said cell. The notches or serrations on the edge of the flange of the feed-wheel $b'$ are so formed that the cells formed by the sides of said notches and the extension $A^3$ is substantially the same as the diameter of the seed to be sown, and in this way but one seed is selected at a time by the cells of this wheel, and the serrations in the flange of the feed-wheel $b^2$ are formed for the same purpose, with the exception that a plurality of seeds will be selected by the respective cells of this feed-wheel. This flange $b^2$ may be termed a "movable" serrated flange.

The feed-wheels are formed with hubs, (indicated by $b^8$,) which are held to the shaft by set-screws $b^9$, and the wheels can be readily adjusted by loosening the set-screws $b^9$, said set-screws constituting means for adjusting said flange $b^2$ and moving the wheels on said shaft until they are in proper adjustment. In this way the size of the cells may be varied to accommodate the different-sized seeds.

There is a partition formed by a plate $b^{10}$, which separates the hopper into different compartments. It is to be understood that there is a complete feed-distributer for each furrow-opener, and as these machines employ a series of furrow-openers there are necessarily a series of distributers, all attached to the shaft extending across the machine, and by reason of the plates $b^{10}$ there are two compartments formed in the hopper for each distributer. The lower end of the plate $b^{10}$ (indicated by $b^{12}$) is adapted to rest upon the top of the extension $A^3$, as shown in Fig. 5. This partition-plate $b^{10}$ carries a projecting plate $b^{11}$, which extends immediately above the delivery-orifice $a^3$ when the partition-plate is in its proper position. At the upper end of the partition-plate there is formed a lateral plate $b^{13}$, having a slot formed therein, and the bolt $b^{14}$, passing through the side of the hopper, forms adjustable means in connection with the slide in the laterally-projecting plate $b^{13}$ for holding the partition-plate in proper position of adjustment.

In order to insure the positive feed of the small grain from the cells formed by the notches in the feeding-wheels without injury to the grain, we employ resilient material— such as leather fabric, felt, or metal—which is indicated by $b^{15}$, Fig. 4, and by adjusting the partition-plate $b^{10}$ we can apply pressure through said fabric, so as to increase the amount of pressure which will tend to force the seeds downwardly out of the cells. In this manner we are able to exert a gentle though positive pressure upon the seed the moment the cell passes over the conduit $a^3$. Said material is supported in part by the projecting flange $a^4$.

Having thus described our invention, we claim—

1. In seeding devices, the combination of hopper and spout, a central support, flanges projecting from said support, seed-feeding flanges formed with serrations above said support-flanges, forming cells, for the purpose specified.

2. In a seeding device, the combination of hopper and spout, a central support between said hopper and spout, flanges formed on said support, and seed-feeding flanges formed with notches adapted to be moved over said support-flanges and forming with said last-mentioned flanges cells for seed, for the purpose specified.

3. In seeding devices, the combination of hopper and spout, a central support, flanges projecting from said support, seed-feeding wheels with flanges formed with serrations above said support-flanges, forming cells, for the purpose specified.

4. In seeding devices, a hopper and spout, a support, flanges projecting from said support, seed-feeding flanges, notches along the periphery of said seed-feeding flanges formed at the edges thereof substantially of the same size as the seed, means for moving said feeding-flanges over the surface of said first-mentioned flanges, for the purpose specified.

5. In seeding devices, a hopper and a spout, a support, flanges projecting from said support, an extension to said support, seed-feeding flanges adapted to coöperate with said extension and said support-flanges, substantially as specified.

6. In seeding devices, hopper and spout, a support, flanges projecting from said support, a plurality of seed-feeding flanges, notches formed on the periphery of each feeding-flange, said notches forming with said support-flanges two opposing series of cells, each series being different in size from the opposing series, for the purpose specified.

7. In seeding devices, hopper and spout, a support, flanges projecting from said support, seed-feeding flanges, notches formed in said seed-feeding flanges, an extension from said support forming a stationary wall for said feeding-flanges and ending at the opening for said spout, for the purpose specified.

8. In seeding devices, hopper and spout, a support, flanges projecting from said support, seed-feeding flanges, notches formed on said feeding-flanges, constituting with said support-flanges seed-cells, and resilient material above said cells and about said spout, and means for increasing the pressure of said material against said cells, for the purpose specified.

9. In seeding devices, a hopper and spout, a support, including projecting flanges, an extension to said support, a guard forming with said extension a channel for seed, seed-feeding flanges, cells formed by said support-flanges, said extension and said seed-feeding flanges, substantially as specified.

10. In a seeding device, a hopper, a spout leading from said hopper, a distributing-wheel projecting into said hopper having a serrated flange, and a stationary floor under said flange terminating at said spout, substantially as specified.

11. In a seeding device, a hopper, a spout leading from said hopper, a revoluble curved serrated wheel extending into said hopper, and a stationary floor under said wheel terminating at said spout, substantially as specified.

12. In a seeding device, a hopper, a spout leading therefrom, a stationary wall in said hopper, a stationary floor adjacent to said wall, a movable serrated seed-feeding flange adapted to be moved over said floor and adjacent to said wall, and means for adjusting said seed-feeding flange with reference to said wall, substantially as specified.

In testimony whereof we have hereunto set our hands this 29th day of February, A. D. 1904.

FRANK R. PACKHAM.
GEORGE P. OATES.

Witnesses:
FRED B. ERNEST,
CHAS. I. WELCH.